United States Patent
Takahashi et al.

(10) Patent No.: US 6,724,959 B1
(45) Date of Patent: Apr. 20, 2004

(54) WEDGED AND LENSED OPTICAL FIBER

(75) Inventors: Mitsuo Takahashi, Matsudo (JP);
Naotoshi Shiokawa, Kamagaya (JP);
Masami Suzuki, Matsudo (JP)

(73) Assignee: Seikoh Giken Co., Ltd., Matsudo (JP)

( * ) Notice: Subject to any disclaimer, the term of this patent is extended or adjusted under 35 U.S.C. 154(b) by 0 days.

(21) Appl. No.: 09/559,525

(22) Filed: Apr. 28, 2000

(30) Foreign Application Priority Data

Apr. 30, 1999 (JP) .......................................... 11/123797

(51) Int. Cl.⁷ .................................................. G02B 6/32
(52) U.S. Cl. .......................................... 385/33; 385/35
(58) Field of Search ............................... 385/35, 38, 33

(56) References Cited

U.S. PATENT DOCUMENTS 3,910,677 A   10/1975  Becker et al.
5,600,744 A * 2/1997  Takahashi ................... 385/38
5,940,557 A * 8/1999  Harker ......................... 385/33
6,024,499 A * 2/2000  Takeda et al. ............... 385/79

* cited by examiner

Primary Examiner—Mark A. Robinson
Assistant Examiner—Alessandro Amari
(74) Attorney, Agent, or Firm—Venable LLP; Michael A. Sartori; Chad C. Anderson (57) ABSTRACT

There is provided an optical fiber to be coupled to a laser diode light source. The optical fiber has a wedge-shaped lens for decreasing the influence of reflection light $B_{R1}$ and returning reflection light $B_{R2}$, whereby the laser diode light source can be operated with stability. The wedged and lensed optical fiber according to the present invention is arranged such that the optical fiber is formed to have a wedge-shaped lens at the tip end thereof, a ridge as a rooftop is made to include the center tip end of a core, the ridge is inclined by an inclination angle $\beta$ with respect to a plane perpendicular to the optical axis of the optical fiber, and the ridge is formed into a semi-cylindrical surface or a conical surface.

6 Claims, 7 Drawing Sheets

PRIOR ART

PRIOR ART

FIG. 6A

PRIOR ART

FIG. 6B

PRIOR ART

PRIOR ART

FIG. 8

PRIOR ART

WEDGED AND LENSED OPTICAL FIBER

BACKGROUND OF THE INVENTION

1. Field of the Invention

The present invention relates to a wedged and lensed optical fiber in which the tip end of the optical fiber is formed into a wedge shape in order that a light beam generated from a laser diode light source is effectively coupled into the optical fiber utilized in an optical fiber communication system. The tip end of the optical fiber is formed into a shape such that a reflection beam or a multiple reflection beam returning from the optical fiber end face to the laser diode light source can be reduced.

2. Description of the Related Art

Figure 8:
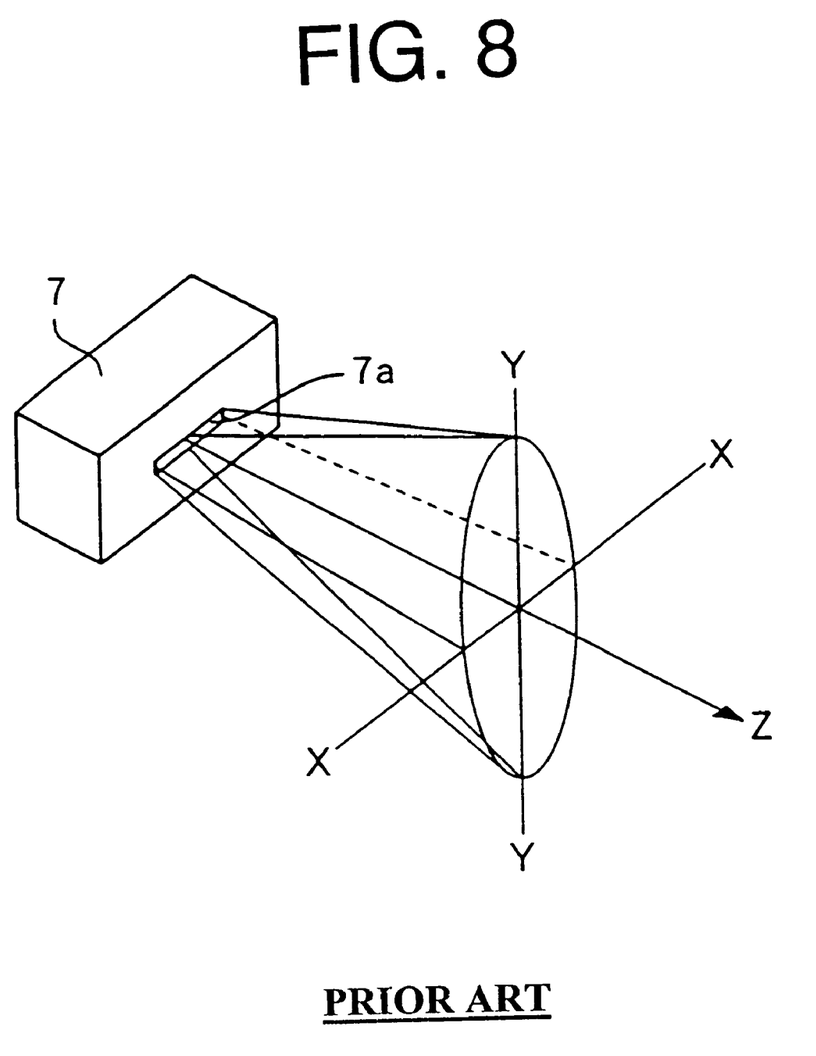
FIG. 8 is a diagram showing an oblique view of the distribution of light emitted from a laser light source.

As has been well known, a laser diode light source 7, as shown in FIG. 8 has an active layer 7a with a light emitting end face such that the dimension in the longitudinal direction (YY-direction) is made relatively small while the dimension in the lateral direction (XX-direction) is relatively large. That is, the end face has an aspect ratio in which the dimension in the longitudinal direction and the dimension in the lateral direction are different from each other. Thus, the light emission pattern of the laser diode becomes an ellipse such that the radiating angle in the longitudinal direction (YY-direction) is relatively large while the radiating angle in the lateral direction (XX-direction) is relatively small.

Figure 6A:
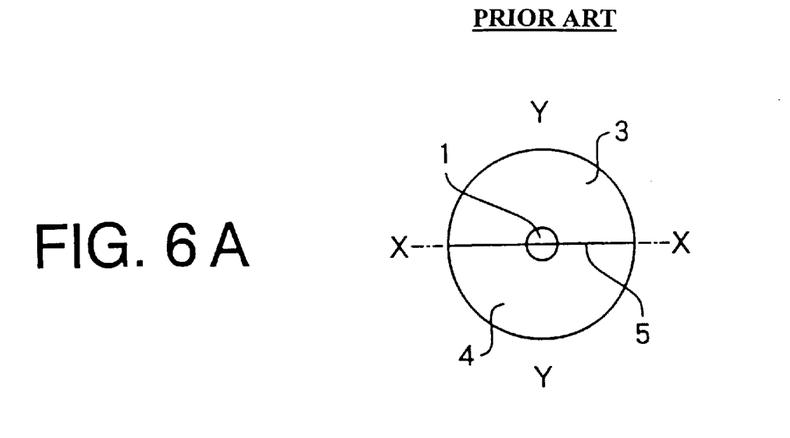
FIG. 6A is a diagram showing a front view of a conventional example of a wedged and lensed optical fiber.
Figure 6B:
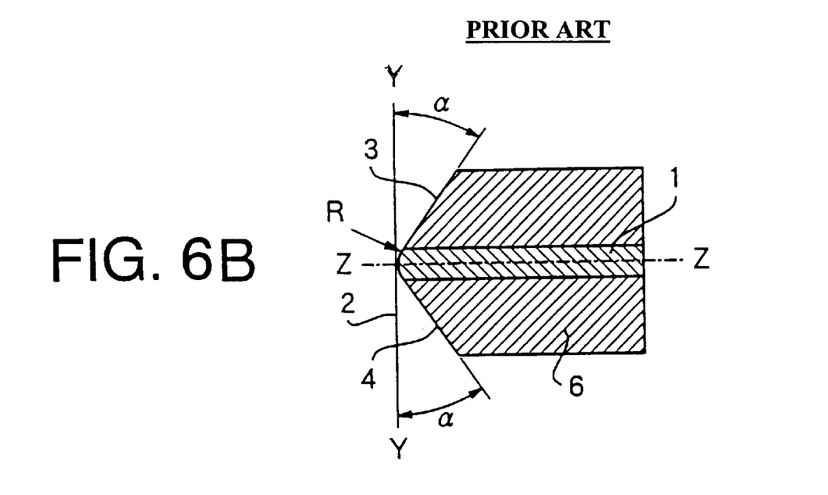
FIG. 6B is a diagram showing a side view of a conventional example.
Figure 6C:
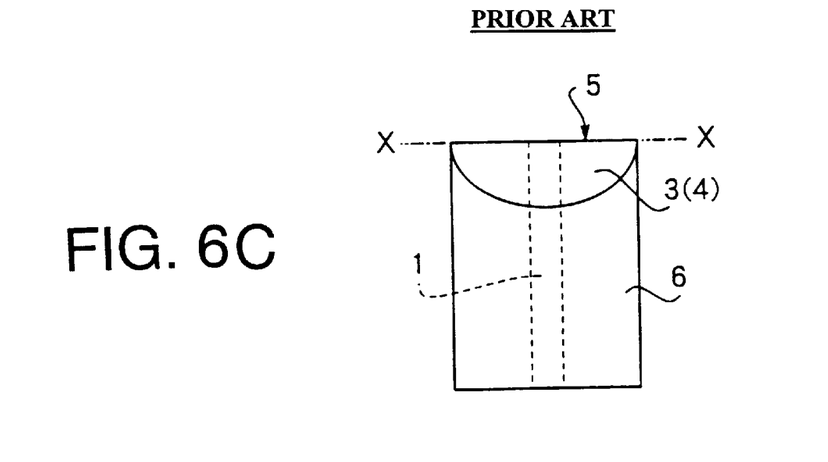
FIG. 6C is a diagram showing a plan view of a conventional example.
Figure 7A:
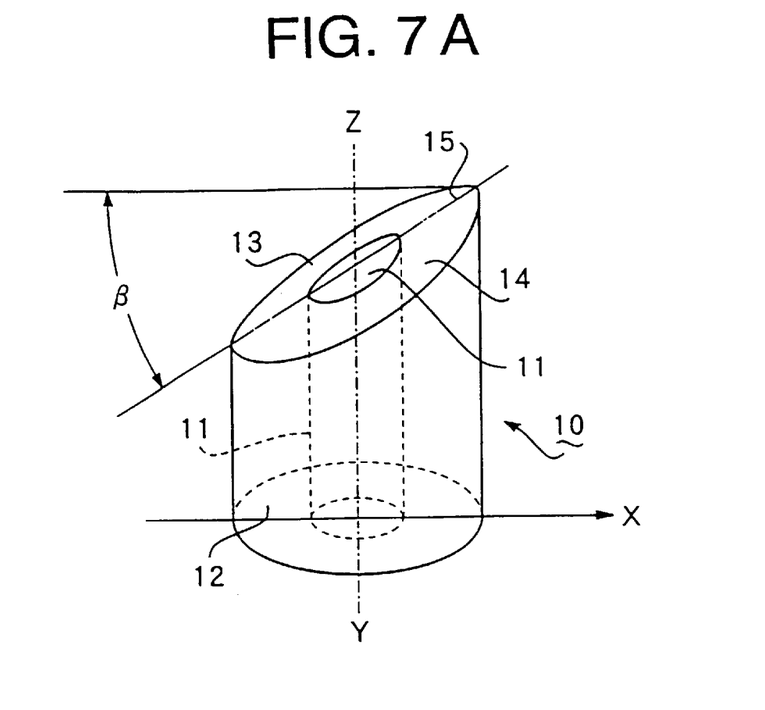
FIG. 7A is a diagram showing an oblique view of the first embodiment of the wedged and lensed optical fiber according to the present invention.
Figure 7B:
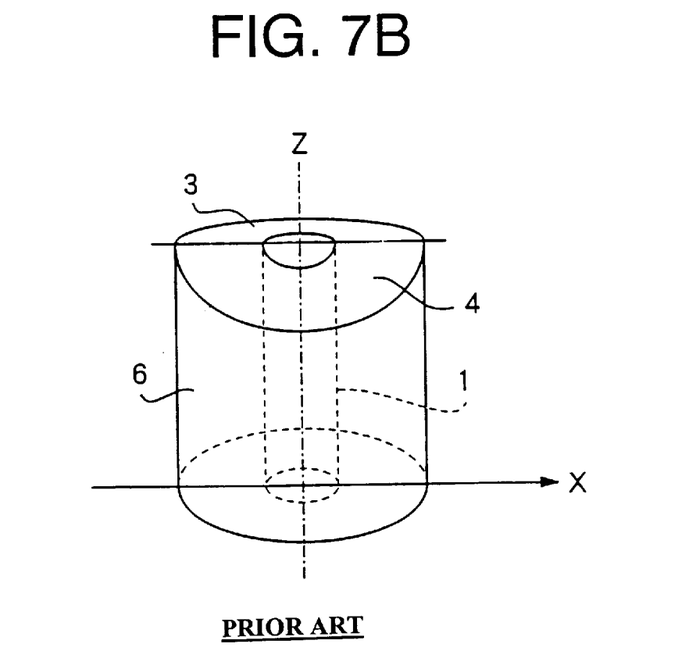
FIG. 7B is a diagram showing an oblique view of the conventional wedged and lensed optical fiber shown in FIGS. 6A to 6C.

U.S. Pat. No. 3,910,677 discloses a proposal in which irradiated light having an elliptical cross-section from the above-described laser diode light source is effectively collected into an optical fiber core having a circular cross-section. A configuration of the tip end of the above-introduced proposal will be described with reference to FIGS. 6A to 6C and FIG. 7B. FIG. 6A is a front view of an optical fiber having a wedged shape according to the conventional technique, and FIGS. 6B, 6C, and 7B are a side view, a plan view, and an oblique view of the wedged and lensed optical fiber shown in FIG. 6A. The optical fiber has an optical fiber core 1 provided at the center of an optical fiber cladding 6. The tip end of the optical fiber is ground to form inclined surfaces 3 and 4 constituting a wedge shape so that the longitudinal direction (YY-direction) of the incident-end surface 2 of the optical fiber is symmetrical with respect to the optical axis (ZZ-direction) and the lateral direction (XX-direction) of the same extends in the direction perpendicular to the optical axis (ZZ-direction). Further, a ridge portion 5 resulting from formation of the wedge shape is formed to have a semi-cylindrical surface. According to the wedged and lensed optical fiber of an experimental trial manufacture using a single-mode optical fiber by the applicant et al. based on the present example, it was confirmed that a coupling efficiency of 80% or more was achieved.

Figure 2A:
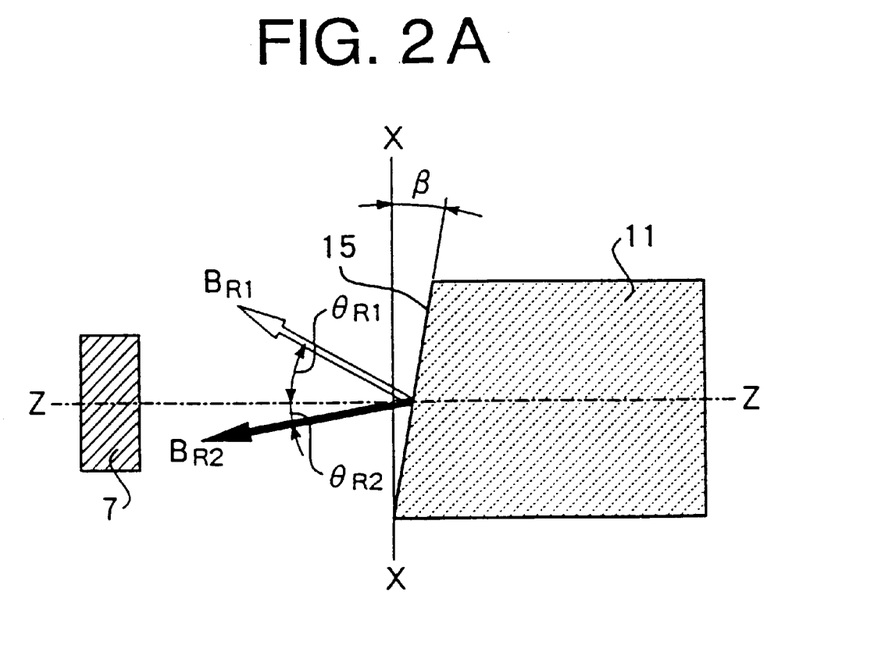
FIG. 2A is a diagram showing the state of reflected returning light from the wedged and lensed optical fiber according to the present invention.
Figure 2B:
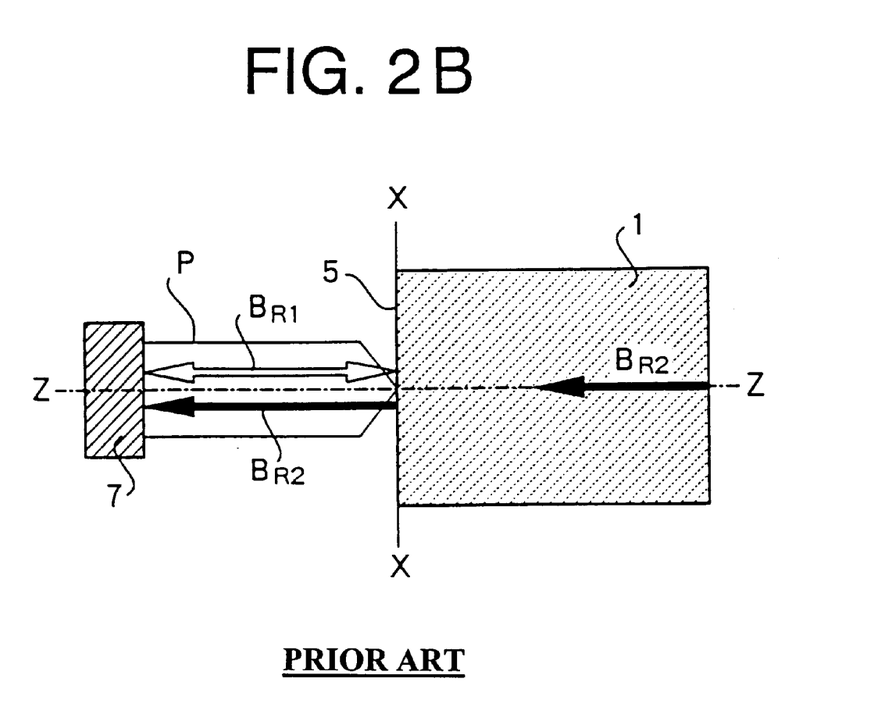
FIG. 2B is a diagram showing the state of reflected returning light from a conventional wedged and lensed optical fiber shown in FIGS. 6A to 6C.

According to the conventional wedged and lensed optical fiber, as shown in FIG. 2B, the ridge of the wedge-shaped portion extends in the lateral direction (XX-direction) in a plane perpendicular to the optical axis (ZZ-direction). Therefore, light P incident along the optical axis (ZZ) of the optical fiber end face (ridge portion) 5 is partly reflected at right angle to become reflected light $B_{R1}$, which then becomes incident on the active layer of the light-emitting end face of the laser diode light source 7. At the same time, the reflected light $B_{R1}$ becomes multiple reflection light repeatedly reflecting between the optical fiber end face 5 and the light-emitting end face of the laser diode light source 7. Furthermore, reflected returning light $B_{R2}$ from a connecting surface (not shown) of an optical fiber circuit is similarly incident on the active layer of the light-emitting end face of the laser diode light source 7.

In this case, if the optical fiber end face 5 is given an antireflection coating (AR coating), the light reflectivity of the reflected light $B_{R1}$ is about 2%. On the other hand, the reflected returning light $B_{R2}$ returning from the connecting surface of the optical fiber circuit varies depending on the condition of the connecting surface of the optical fiber circuit. However, a reflectivity of 1.6% at most can be expected. The reflected light $B_{R1}$ and the reflected returning light $B_{R2}$ incident on the active layer of the light-emitting end surface of the laser diode light source 7 will negatively influence stable operation of the laser diode light source 7. Therefore, it is necessary to reduce the influence of the reflected light $B_{R1}$ and the reflected returning light $B_{R2}$ as far as possible.

SUMMARY OF THE INVENTION

Accordingly, it is an object of the present invention to provide a wedged and lensed optical fiber which can reduce the above-described negative influence caused by the reflected light $B_{R1}$ and the reflected returning light $B_{R2}$ on the stable operation of the laser diode light source.

Accordingly the present invention is provided with a wedged and lensed optical fiber in which the optical fiber is ground so that the ridge of the wedge-shaped optical fiber is formed into an inclined surface with an inclination angle of ($\beta$) with respect to a plane perpendicular to the optical axis (ZZ) of the optical fiber.

Further, it is another object of the present invention to provide an arrangement of an optical fiber in which the wedged and lensed optical fiber is supported in a ferrule.

In order to achieve the above objects, according to one aspect of the present invention, there is provided an optical fiber comprising a wedge-shaped lens at the tip end thereof, wherein a ridge of the optical fiber is formed such that the center tip end of a core lies in the ridge and the ridge is inclined to have an inclination angle ($\beta$) with respect to a plane perpendicular to an optical axis of the optical fiber, and the ridge is formed into one of a semi-cylindrical surface and a conical surface.

In an optical fiber comprising a wedge-shaped lens, if a Z-axis is introduced so as to be coincident with the optical axis of the optical fiber and an XZ-plane is defined so that the ridge of the wedge-shaped lens lies in the XZ-plane, the optical fiber is supported so that the ridge is in parallel with a grinding surface and thereafter the optical fiber is tilted, whereby a pair of inclined surfaces are formed so that each of the surfaces has an inclination angle ($\alpha$) with respect to a plane perpendicular to the XZ-plane, and the ridge is formed into one of a semi-cylindrical surface and a conical surface by the grinding.

According to the above arrangement, the tip end side of the ridge can be cut away to form a flat surface up to the vicinity of the outer periphery of the core. Thus, the tip end of the optical fiber can be brought close to the light source.

According to another aspect of the present invention, there is provided an optical fiber comprising a wedge-shaped lens having a tip end thereof supported in a ferrule with a conical shape at the tip end thereof, and formed into a rooftop shape together with the tip end of the ferrule, wherein a ridge of the optical fiber is formed so as to include the center of a core at the tip end and to be inclined to have an inclination angle ($\beta$) with respect to a plane perpendicular to an optical axis of the optical fiber, and the ridge is formed into one of a semi-cylindrical surface and a conical surface together with the conical surface of the ferrule.

If a Z-axis is introduced so as to be coincident with the optical axis of the optical fiber supported in the ferrule and an XZ-plane is defined so that the ridge of the wedge-shaped lens lies in the XZ-plane, the wedged and lensed optical fiber is supported together with the ferrule so that the ridge is in parallel with a grinding surface and thereafter the optical fiber is tilted, whereby a pair of inclined surfaces are formed on the tip end of a conical surface of the optical fiber and the ferrule so that each of the surfaces has an inclination angle (α) with respect to a plane perpendicular to the XZ-plane, and the ridge is formed into one of a semi-cylindrical surface and a conical surface on the optical fiber together with the conical surface of the ferrule by the grinding.

The inclination of the generatrix of the cone of the ferrule at the tip end of the optical fiber is made substantially equal to the inclination angle a of the inclined surfaces.

The ferrule may be provided with an index determining the direction in which the ridge extends. The index may be formed by partly changing the columnar surface of the ferrule into some shape. Alternatively, the index may be implemented by providing a machined part fixed to the ferrule.

One of the semi-cylindrical surface and the conical surface formed on the ridge serves as a positive lens in the YZ-plane.

The inclination angle (β) of the ridge at the tip end of the optical fiber is set so that $\beta \geq 1°$.

DESCRIPTION OF THE PREFERRED EMBODIMENTS

Figure 1A:
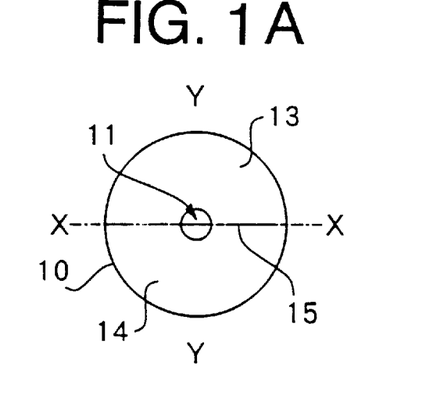
FIG. 1A is a diagram showing a front view of a first embodiment of a wedged and lensed optical fiber according to the present invention.
Figure 1B:
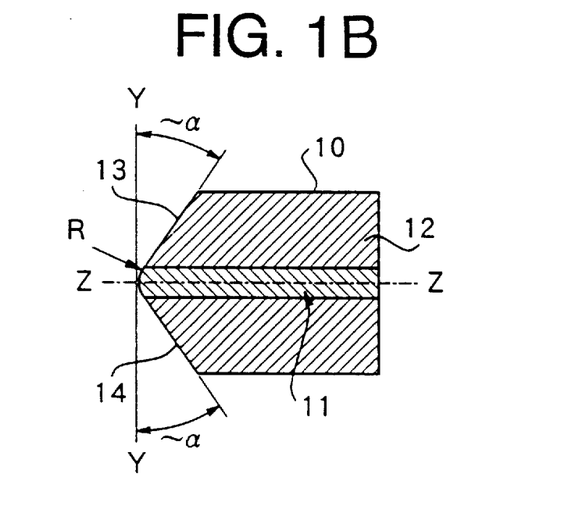
FIG. 1B is a diagram showing a side view of the first embodiment.
Figure 1C:
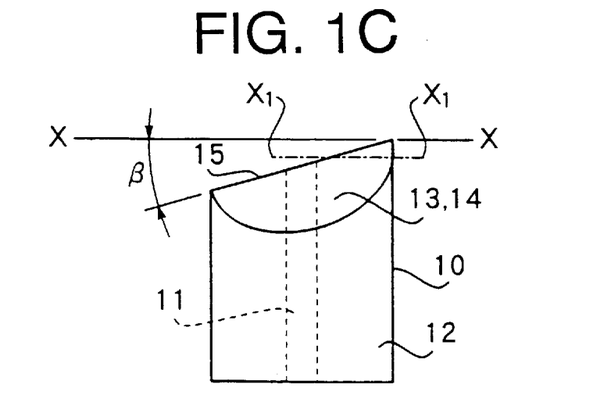
FIG. 1C is a diagram showing a plan view of the first embodiment.

Embodiments of a wedged and lensed optical fiber according to the present invention will hereinafter be described in more detail with reference to the drawings. FIG. 1A is a diagram showing a front view of a first embodiment of the wedged and lensed optical fiber according to the present invention. FIG. 1B is a side cross-section, FIG. 1C is a plan view, and FIG. 7A is an oblique view of the first embodiment of the present invention. An optical fiber 10 is formed of an optical fiber cladding 12 and an optical fiber core 11 provided at the center of the optical fiber cladding 12.

If a Z-axis is introduced so as to coincide with the optical axis of the optical fiber 10, inclined surfaces 13 and 14 are formed in a symmetrical fashion with respect to the ZX-plane. According to the embodiment, the inclined surfaces 13 and 14 are provided so as to make an inclination angle a with a plane that is perpendicular to the ZX-plane and which contains a ridge 15. Thus, the inclined surfaces 13 and 14 constitute a wedge shape. The ridge 15 is-ground to form a semi-cylindrical lens with a radius of curvature R.

The above-described shape can be obtained by the following grinding process. That is, X-Z coordinates are introduced so that the Z axis coincides with the optical axis of the optical fiber 10 while the XZ-plane contains the ridge 15. The optical fiber 10 is supported so that the ridge 15 is placed in parallel with the grinding plane. Thereafter, the inclined surfaces 13 and 14 are ground one after another while the optical fiber 10 maintains its attitude such that the inclined surfaces 13 and 14 are placed in parallel with the grinding plane. In this way, a wedge shape is obtained which is formed of the inclined surfaces 13 and 14 making the inclination angle a relative to the plane that is perpendicular to the ZX-plane and which contains the ridge 15. Thereafter, the position of a ferrule with respect to the grinding plane is changed to form a semi-cylindrical surface on the ridge 15.

The tip-end side of the ridge 15, that is, the right hand shoulder of the ridge in FIG. 1C, may be cut away to form a plane thereat at a line $X_1$—$X_1$ near the core periphery. If such cutting away is carried out, it becomes possible for the optical fiber 10 to be brought close to the light source. Thus, the optical fiber 10 can cope with a light source having a light irradiation characteristic with a wider angle.

FIG. 2A is a diagram showing the state of reflection returning light reflected from the tip end face of the wedged and lensed optical fiber 10 according to the embodiment of the present invention. The ridge 15 is included in the ZX-plane and is inclined by an inclination angle β with respect to the plane (XY-plane) which is perpendicular to the optical axis.

Figure 3:
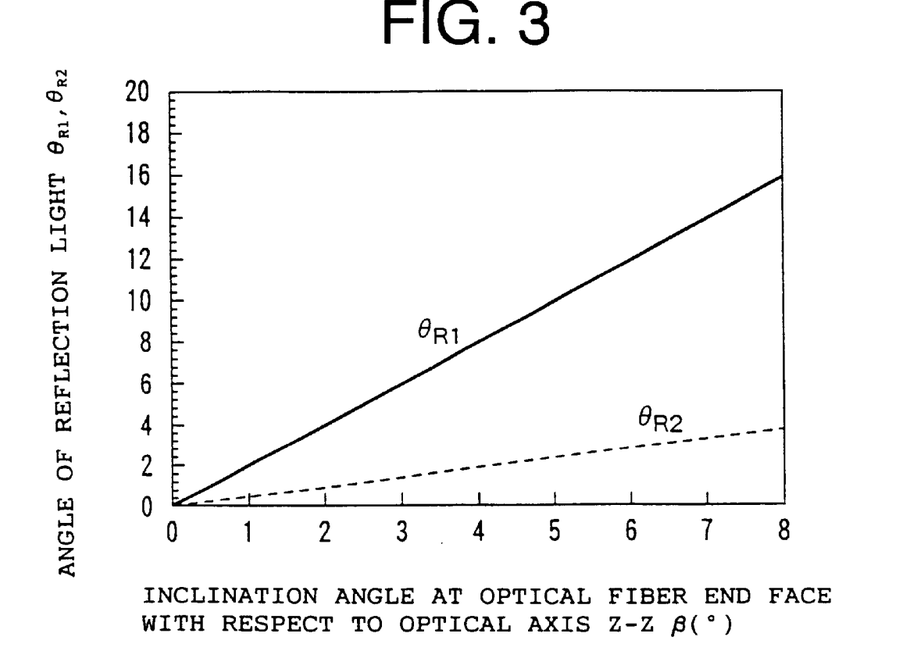
FIG. 3 is a diagram showing the relationship between the inclination angle at the end face of the optical fiber and an angle at which light is reflected.

$\theta_{R1}$ is taken as an angle between irradiated light traveling along the optical axis (ZZ) from a laser diode 7 and reflection light $B_{R1}$ reflected from the end face (ridge) 15 of the optical fiber 10, while $\theta_{R2}$ is taken as an angle between reflection returning light $B_{R2}$ traveling through the optical fiber 10 and the optical axis (ZZ). FIG. 3 is a graph showing the relationship between the variation in the inclination angle β and the reflection angles $\theta_{R1}$ and $\theta R_2$. If β=0°, then, the reflection angles $\theta_{R1}$ and $\theta_{R2}$ become also 0°, with the result that coupling of the reflection returning light $B_{R2}$ is caused. As will be understood from the figure, particularly, the reflection angle $\theta_{R1}$ of the reflection light $B_{R1}$, which tends to have a large intensity due to the laser diode irradiation light, can be made relatively large, that is, $2\beta$.

Figure 4:
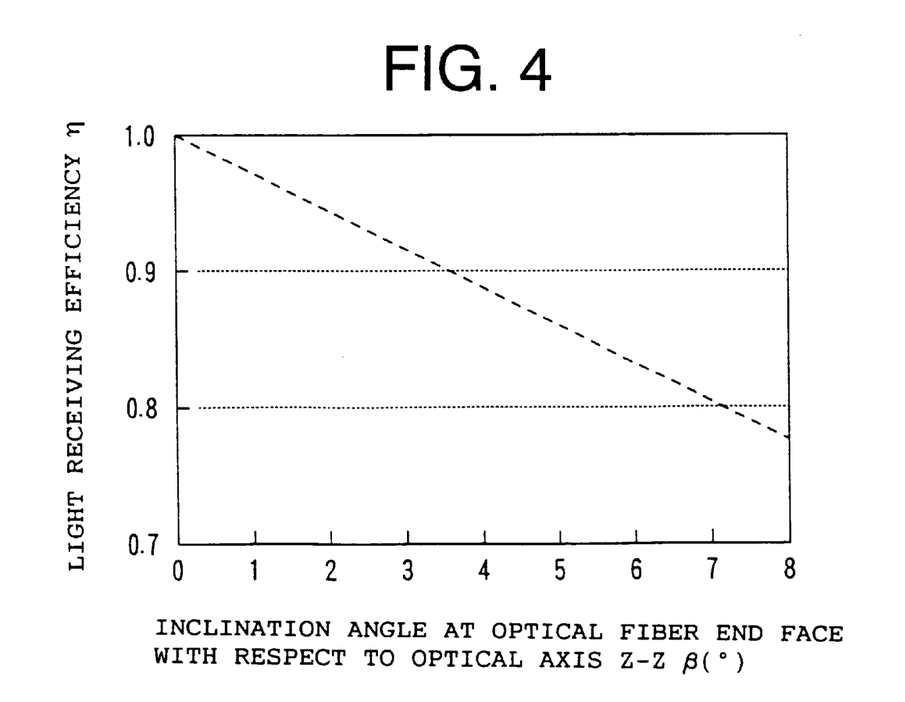
FIG. 4 is a diagram showing the relationship between the inclination angle at the end face of the optical fiber and the light receiving efficiency thereat.

FIG. 4 is a graph showing the relationship between the inclination angle $\beta$ and the light receiving efficiency at the end face of the optical fiber. As shown in the figure, as the inclination angle $\beta$ increases at the end face of the optical fiber, the light receiving efficiency at the end face of the optical fiber is decreased. Therefore, it is desirable for the inclination angle $\beta$ to be set to the minimum. Experiments conducted by the applicant et al. reveal that when the inclination angle $\beta$ is set to about 4° to 5°, then the laser diode was able to be remarkably relieved from instability in operation caused by each of the reflection light beams.

Figure 5A:
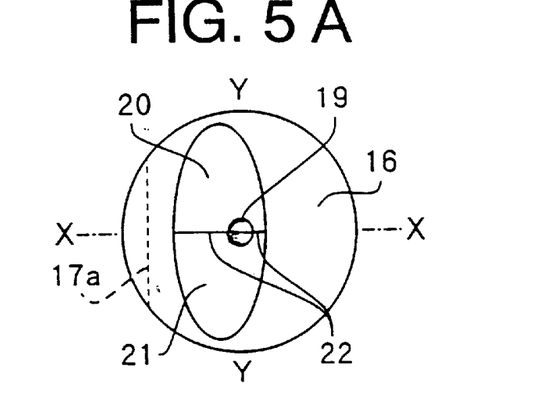
FIG. 5A is a diagram showing a front view of a second embodiment of the wedged and lensed optical fiber according to the present invention.
Figure 5B:
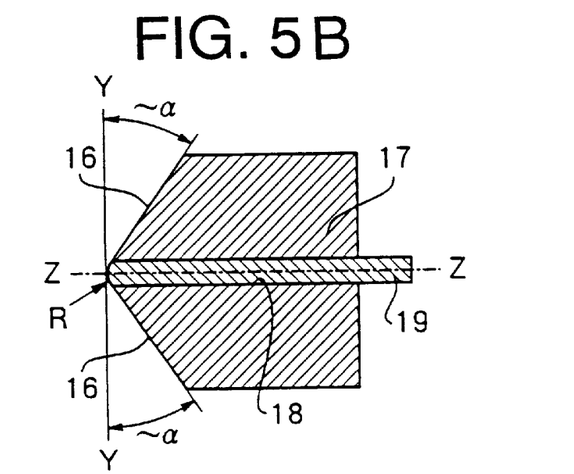
FIG. 5B is a diagram showing a side view of the second embodiment.
Figure 5C:
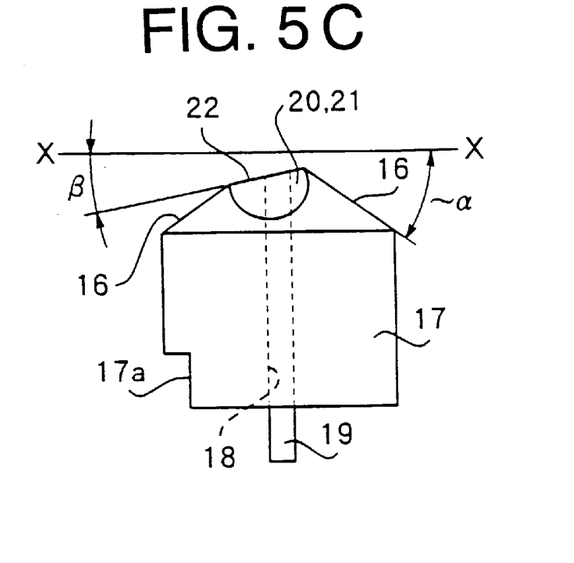
FIG. 5C is a diagram showing a plan view of the second embodiment.

A structure of a second embodiment of the wedged and lensed optical fiber according to the present invention will hereinafter be described with reference to FIGS. 5A to 5C. FIG. 5A is a diagram showing a front view of the second embodiment of the wedge-shaped lens according to the present invention, FIG. 5B is a diagram showing a side cross-section of the second embodiment, and FIG. 5C is a diagram showing a plan view of the same. The tip end face of a ferrule 17 is formed into a conical surface 16 and has a through hole 18 provided at the center thereof. An optical fiber 19 is inserted into the through hole 18 so that a part of the optical fiber projects at the tip end thereof. Then, the optical fiber 19 is fixed to the ferrule 17. The tip end of the ferrule 17 is formed in advance so that the faces of the wedge-shaped lens of the optical fiber have an inclination angle a or an angle close to $\alpha$.

The optical fiber 19 is inserted into the through hole 18 of the optical fiber ferrule 17 having a tip end with a conical surface. Under this condition, the inclined surfaces 20 and 21 of the wedge-shaped portion and a ridge 22 are formed to have the inclination angle of $\alpha$ and an inclination angle of $\beta$ by a process similar to that of the above-described optical fiber 11 with the wedge-shaped lens according to the first embodiment. Further, the ridge 22 is ground to have a semi-cylindrical surface with a radius of curvature R. Thus, the forming of the optical fiber 17 is completed.

If the laser diode 7 has a light irradiation distribution as shown in FIG. 8, the wedged and lensed optical fiber is coupled to the laser diode 7 in such a manner that the optical axis of the optical fiber coincides with the Z-axis in FIG. 8, the ridge 22 of the wedge-shaped lens lies in the XZ-plane of FIG. 8, and the ridge maintains the inclination angle p with respect to the XX-axis of FIG. 8. For this reason, the optical fiber ferrule 17 of the second embodiment has a reference plane 17a provided so that the reference plane 17a in parallel with the YZ-plane in FIGS. 5A to 5C. If the reference plane 17a abuts against a reference plane (not shown) which is made parallel with the YZ-plane and which is provided on the side of the laser diode 7, then the optical fiber 19 is fixed to the laser diode 7 to attain the above-described positional relationship therebetween.

The wedged and lensed optical fiber is coupled to the laser diode light source 7 shown in FIG. 8 in the following manner. That is, the optical fiber ferrule 17 is disposed so that the reference plane 17a becomes parallel with the YZ-plane in FIG. 8 and the center axis of the optical fiber ferrule 17 (i.e., the optical axis Z of the optical fiber 19) coincides with the optical axis (Z-axis) of the laser diode 7.

As described above in detail, according to the wedged and lensed optical fiber of the present invention, the ridge of the wedge-shaped portion is formed into an inclined surface having an inclination angle P with respect to the plane perpendicular to the optical axis, and the ridge portion is ground to have a semi-cylindrical lens. Therefore, it is possible to reduce negative influences caused by returning reflection light returning from the light incident surface of the optical fiber to the laser diode light source. Moreover, if the optical fiber employs a ferrule having a conical surface at the tip end thereof, as described in the second embodiment, the optical fiber can be formed into a desired shape by grinding with the smallest amount of material removed. For this reason, it becomes possible to decrease the cost of manufacturing the optical fiber and also it becomes possible to prevent the optical fiber from deterioration which is caused in a forming process.

Various modifications can be effected on the embodiments of the present invention described above in detail. While in the above embodiments an index determining the direction in which the ridge extends is provided on the ferrule itself, the direction be determined by another member integrally attached to the ferrule. Further, while in the above embodiments the ridge is ground to have a semi-cylindrical surface, the surface may be formed into a conical surface. In other words, the conventional example shown in FIGS. 6A to 6C may be arranged to have a ridge having the inclination angle $\beta$ with respect to the plane perpendicular to the optical axis. According to this arrangement, an effect similar to that of the above-described embodiments will be obtained.

The embodiments of the present invention may be modified in such a manner that the ridge is made to have a width substantially the same as that of the core of the optical fiber at the tip end thereof, and the corners of the ridge are chamfered. According to this arrangement, the tip end of the optical fiber can offer a convergence effect similar to the above-described embodiments. Therefore, the arrangement having this shape can be regarded as a modification of the present invention.

What is claimed is:

1. An optical fiber comprising a wedge-shaped lens having a tip end thereof supported in a ferrule with a conical shape at the tip end thereof, and formed into a rooftop shape together with the tip end of the ferrule, wherein a ridge of the optical fiber is formed so as to include the center of a core at the tip end and to be inclined to have an inclination angle ($\beta$) with respect to a plane perpendicular to an optical axis of the optical fiber, the ridge is formed into one of a semi-cylindrical surface and a conical surface together with the conical surface of the ferrule and extends in a direction, the tip end is symmetrical with respect to only a single plane, and the tip end is adapted to be supported in a ferrule provided with an index indicating the direction in which the ridge extends, wherein the optical fiber is generally cylindrical with an outer circumference, and the ridge has a shoulder cut to form a plane perpendicular to the optical axis of the optical fiber.

2. The optical fiber according to claim 1, wherein the cone of the ferrule at the tip end of the optical fiber has a generatrix having an inclination substantially equal to the inclination angle a of the inclined surfaces.

3. The optical fiber according to claim 1, wherein one of the semi-cylindrical surface and the conical surface formed on the ridge serves as a positive lens in the YZ-plane.

4. An optical fiber according to claim 1, wherein the inclination angle ($\beta$) of the ridge at the end of the optical fiber is set so that $\beta \geq 1°$.

5. The optical fiber of claim 1, wherein the optical fiber is generally cylindrical with an outer circumference, and the ridge has an apex on the outer circumference of the optical fiber.

6. An assembly comprising:

an optical fiber comprising a wedge-shaped lens having an optical fiber tip end and a core; and a ferrule for supporting the optical fiber, the ferrule having a ferrule tip end having a conical shape and formed into a rooftop shape with the optical fiber tip end, wherein the optical fiber has a ridge formed so as to include the center of the core at the optical fiber tip end and to be inclined to have an inclination angle ($\beta$) with respect to a plane perpendicular to an optical axis of the optical fiber, the ridge is formed into one of a semi-cylindrical surface and a conical surface together with the conical surface of the ferrule and extends in a direction, the optical fiber tip end is symmetrical with respect to only a single plane, and the ferrule is provided with an index indicating the direction in which the ridge extends, wherein the optical fiber is generally cylindrical with an outer circumference, and the ridge has a shoulder cut to form a plane perpendicular to the optical axis of the optical fiber.

* * * * *